Aug. 4, 1953     H. M. RICHARDSON ET AL     2,647,284
METHOD FOR CURVING A FLAT MOLDED PLASTIC PRINTING PLATE
Filed Feb. 25, 1949
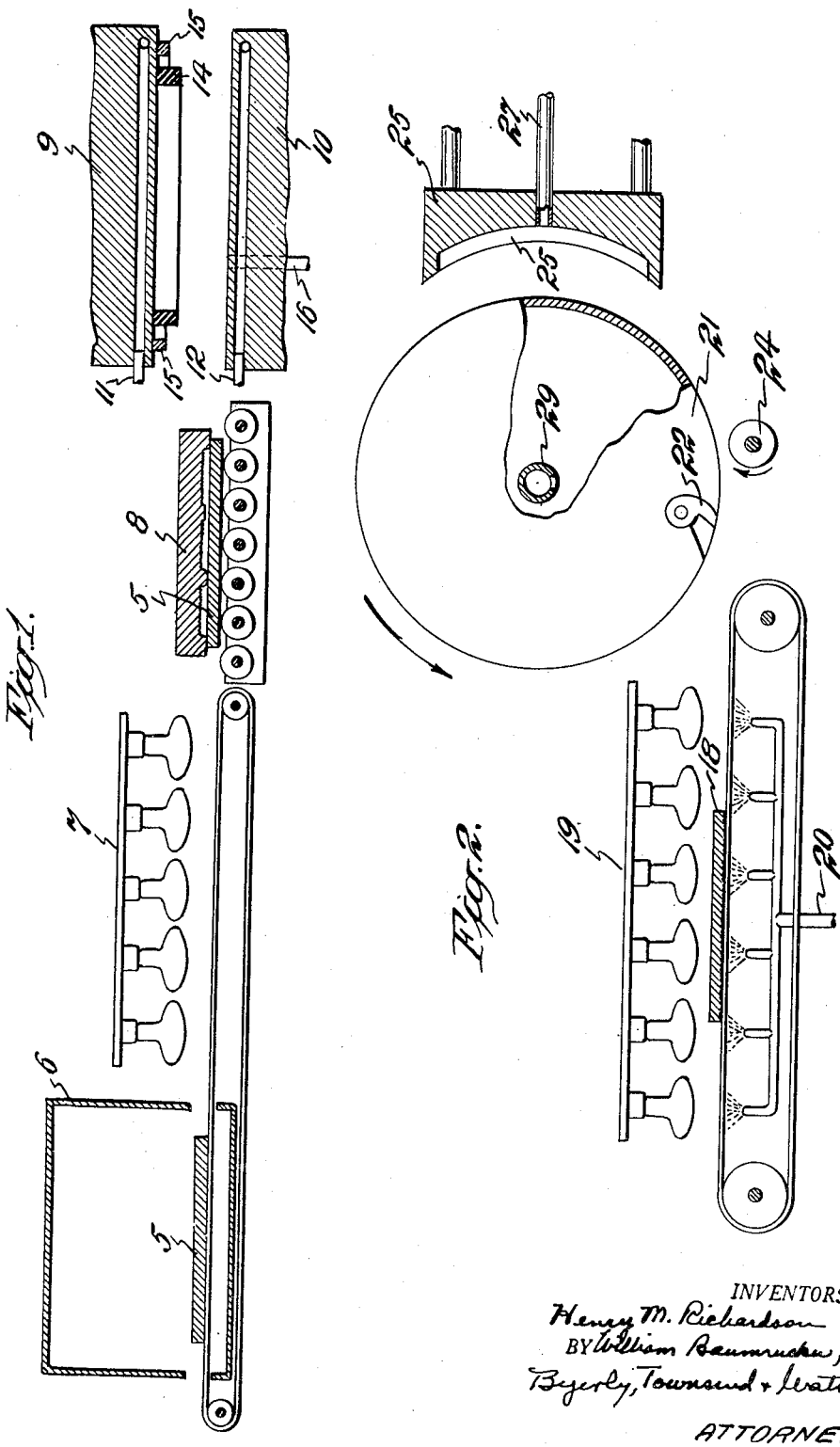
INVENTORS
Henry M. Richardson and
BY William Baumrucker, Jr.
Byerly, Townsend & Watson
ATTORNEYS Patented Aug. 4, 1953

2,647,284

UNITED STATES PATENT OFFICE 2,647,284

METHOD OF CURVING A FLAT MOLDED PLASTIC PRINTING PLATE

Henry M. Richardson, Springfield, Mass., and William Baumrucker, Jr., Stamford, Conn., assignors to News Syndicate Co., Inc., New York, N. Y., a corporation of New York Application February 25, 1949, Serial No. 78,276

2 Claims. (Cl. 18—56)

1

This invention relates to printing and aims to provide an improved method of preparing a molded plastic printing plate.

It is a particular object of our invention to provide a method of preparing plastic printing plates which can be practiced in the production of newspapers. To satisfy the requirements of newspaper production it is essential that the printing plates be produced at very high speed.

It is known that plastic printing plates are superior to the usual stereotype plates in the following respects: They have better wearing qualities and resistance to injury; they are lighter in weight and easier to handle; they can be produced with less variations in thickness and surface grain; and they permit the reproduction of engravings and type faces with a fidelity which is not attainable with stereotype plates. Nevertheless, the uses to which molded plastic printing plates have been put has been very limited. Heretofore, it has not been possible to use them successfully in the production of newspapers and commercial use for other printing purposes has been limited by the slowness of production.

Plastic printing plates have been made in the past by covering the face of a matrix with a powdered or granular thermoplastic material. The matrix used for this purpose is a hard rigid flat sheet whose face bears a reproduction in intaglio of the face of a printing form. The matrix bearing the powdered thermoplastic material was placed in a press where it was subjected to moderate pressure and heat sufficient to melt the thermoplastic material so that it would flow over the face of the matrix, penetrate the depressions in that matrix, and form a sheet whose face bore an impression of the face of the matrix. The molded sheet was then cooled to produce a flat rigid printing plate. This molding operation was too slow for general use. A further limitation upon the use to which the flat printing plates produced by this method could be put resulted from the fact that they could not be used easily on the cylinder of a rotary press.

We have discovered that it is possible to produce a molded plastic printing plate at speeds which fully meet the requirements of newspaper printing and other commercial uses, and that such a printing plate may be curved to conform to the curvature of the printing press cylinder for which it is designed.

A molded plastic printing plate is prepared by heating the face of a flat sheet of thermoplastic material to molding temperature. The heated face of this sheet is placed against the face of a matrix and this assembly is enclosed in a sealed chamber between cooled platens of a molding press. The air is evacuated from that chamber and the sheet and matrix are then subjected to pressure between the platens of the molding press to mold the sheet into a printing plate. A flat plastic printing plate, preferably prepared as described above, is converted into a curved printing plate which will fit on the surface of a cylinder of a rotary printing press by heating the back of the plate until it is flexible. The heated back of this plate is immediately pressed against the surface of a bending roll whose curvature is matched to that of the cylinder for which the printing plate is designed. While the plate is pressed against the bending roll it is cooled and hardened. The heated back of the plate is preferably forced against the surface of the bending roll by exerting a fluid pressure on the face of the plate.

In order that the practice of our invention will be clear to those skilled in the art to which it pertains, we will describe the specific mode of practicing it which is illustrated diagrammatically in the accompanying drawings in which:

Fig. 1 illustrates the steps which are performed in the molding operation; and

Fig. 2 illustrates the steps which are performed in the curving operation.

In the method illustrated in the drawings, a printing plate is made from a sheet 5 of thermoplastic material about three-sixteenths of an inch thick. That sheet is composed of a resinous material such as vinyl chloride copolymer resin which is hard and rigid at ordinary room temperatures but which is sufficiently soft and plastic for molding at a temperature in the range of 250°–300° F.

The sheet 5 is first conveyed through an oven 6 where it is preheated to a temperature between 100° and 200° F. It is then conveyed beneath a battery 7 of infra-red heating lamps which are directed toward the face of the sheet and heat that face to molding temperature. After the face of the sheet 5 has been heated to molding temperature, a matrix 8 is placed face down on the heated face of sheet 5 and this assembly is immediately placed between the platens 9, 10 of a molding press, preferably of the quick-acting hydraulic type. A matrix which is particularly suitable is described in co-pending application, Serial No. 78,275, filed by one of us on February 25, 1949. The press platens 9, 10 are maintained at a temperature which is well below the molding temperature of sheet 5. This is accomplished by supplying brine or other cooling medium to platen 9 through pipe 11 and by supplying a like cooling medium to platen 10 through pipe 12.

The press platen 9 is equipped with a compressible sealing gasket 14 and with stops 15. The press platen 10 is equipped with a conduit 16 which leads to a vacuum pump and receiver (not shown). Immediately after the sheet 5 and matrix 8 are placed in the press, the platens 9, 10 are forced together. The distance between the closed platens, and the extent to which the matrix 8 is forced against sheet 5, is controlled by the stops 15.

The compressible gasket 14 is adapted to surround the sheet 5 and matrix 8 when they are in the press to provide a sealed chamber which is formed as the platens are closed. As soon as this sealed chamber is formed, a valve (not shown) on pipe 16 is opened automatically and the sealed chamber is evacuated. This step prevents the entrapment of air between the faces of the sheet 5 and the matrix 8 and is of great importance in the practice of our method.

We have found that the speed at which the heated plastic sheet 5 can be converted into a printing plate 18 is a function of the temperature differential between that heated sheet and the cooled platens 9, 10. That temperature differential is governed in general by the temperature at which those platens are maintained, and its magnitude is limited by, and dependent upon, the molding pressure to which the sheet 5 and the matrix 8 are subjected between the platens 9, 10. When the temperature differential between the heated sheet 5 and the cooled platens 9, 10 is increased by deceasing the temperature of the platens, the speed at which the sheet can be converted into a hard printing plate is also increased. The briefer the period within which sheet 5 hardens in the press, the greater the molding pressure which must be applied to assure the necessary faithful impression of the face of the matrix on the face of the sheet before the sheet becomes hardened.

We prefer in molding sheet 5 into a printing plate to maintain the temperature of the platens 9, 10 at about 50° F. The molding pressure to which the sheet 5 and matrix 8 are then subjected is of the order of 3,000 pounds per square inch. At such a pressure and temperature the heated sheet 5 can be quickly molded into a printing plate 18 while plastic and become hardened before it is removed from the molding press so that it retains the impression of the matrix face. This process can be completed in the extremely brief period of about fifteen seconds.

It is not essential that such an extremely high speed be maintained to meet the requirements of every type of commercial printing. It will be satisfactory in certain types of commercial printing if the printing plates are made at slower speeds such as can be attained by subjecting sheet 5 and the matrix 8 to a lower molding pressure (of the order of 500 or more pounds per square inch) and by maintaining the lower temperature differential between the heated sheet 5 and the cooled platens 9, 10 which will permit the plastic material in that sheet to flow and be molded into a printing plate by such a pressure before it becomes hardened.

When the flat printing plate 18 is to be used on a rotary press it is curved after it leaves the hydraulic press to fit the printing cylinder for which it is designed. To accomplish this, plate 18 is conveyed past a battery 19 of infra-red heating lamps which are directed toward the back of the plate. As the plate 18 passes the battery of infra-red lamps 19, the face of the plate is chilled, as by jets of cool air supplied through conduit 20. As a result, the back of the plate is raised to a temperature in the range of 160°–250° F., while the face of the plate is prevented from reaching a temperature at which it is soft enough to lose the impression of the matrix face which has been molded therein. The plate 18 is thus rendered sufficiently flexible to permit it to be wrapped around the surface of a bending roll 21 which rotates in the direction indicated by the arrow.

The bending roll 21 is of suitable curvature to match the printing press cylinder upon which the printing plate 18 is designed to be used. The flexible plate 18 is conveyed to that bending roll 21 and its leading edge is seized by the gripper 22. As the bending roll 21 revolves, the back of the flexible plate 18 is directed against the surface of the bending roll by a roller 24. However, since the molded face of the printing plate is not of uniform height, such a roller cannot exert the uniform pressure which is necessary to cause all portions of the back of the plate to fit snugly against the bending roll.

The back of the printing plate 18 is made to conform exactly with the contour of the bending roll 21 by exerting a fluid pressure against the face of plate 18. This is accomplished through a reciprocating box 25 which is recessed at 26. When the plate 18 is conveyed by the bending roll 21 to a point opposite the box 25, the edges of the box are forced against the blank margin provided on plate 18 which then forms a chamber with recess 26. Compressed air is then supplied to that chamber through pipe 27. The fluid pressure of this compressed air against the face of the printing plate forces the back of the plate uniformly against the surface of the bending roll 21.

The bending roll is maintained at a temperature of about 100° F. through a heating medium supplied to the interior of that roll through conduit 29. The temperature of the curved printing plate 28 is reduced to the point at which the material forming the plate is hard and rigid while the printing plate hugs the bending roll 21 and the curvature imparted to the plate on that bending roll is retained by the plate after it is removed from the bending roll.

The terms which are used herein are terms of description and not of limitation, and it is to be understood that modifications may be made in the specific mode of practicing our invention which we have described without departing from the spirit of our invention as it is defined in the appended claims.

What is claimed is:

1. The method of curving a flat molded plastic printing plate to fit the cylinder of a rotary printing press which comprises heating the back of the molded sheet to render it flexible and simultaneously cooling the face of said sheet, and then pressing the back of said sheet against the surface of a bending roll to curve and harden it.

2. The method of curving a flat molded plastic printing plate to fit the cylinder of a rotary printing press which comprises heating the back of the molded sheet to render it flexible and simultaneously cooling the face of said sheet, and then placing the back of said sheet against the surface of a bending roll and subjecting the face of said sheet to fluid pressure to curve and harden it.

HENRY M. RICHARDSON.
WILLIAM BAUMRUCKER, Jr.

References Cited in the file of this patent

UNITED STATES PATENTS

| Number | Name | Date |
|---|---|---|
| 130,140 | Judson | Aug. 6, 1872 |
| 1,132,384 | Richter | Mar. 16, 1915 |
| 1,190,072 | Aiken | July 4, 1916 |
| 1,785,391 | Russell | Dec. 16, 1930 |
| 2,030,066 | Jenett | Feb. 11, 1936 |
| 2,075,636 | Browne | Mar. 30, 1937 |
| 2,397,827 | Williams | Apr. 2, 1946 |
| 2,442,338 | Borkland | June 1, 1948 |